Figure 1:
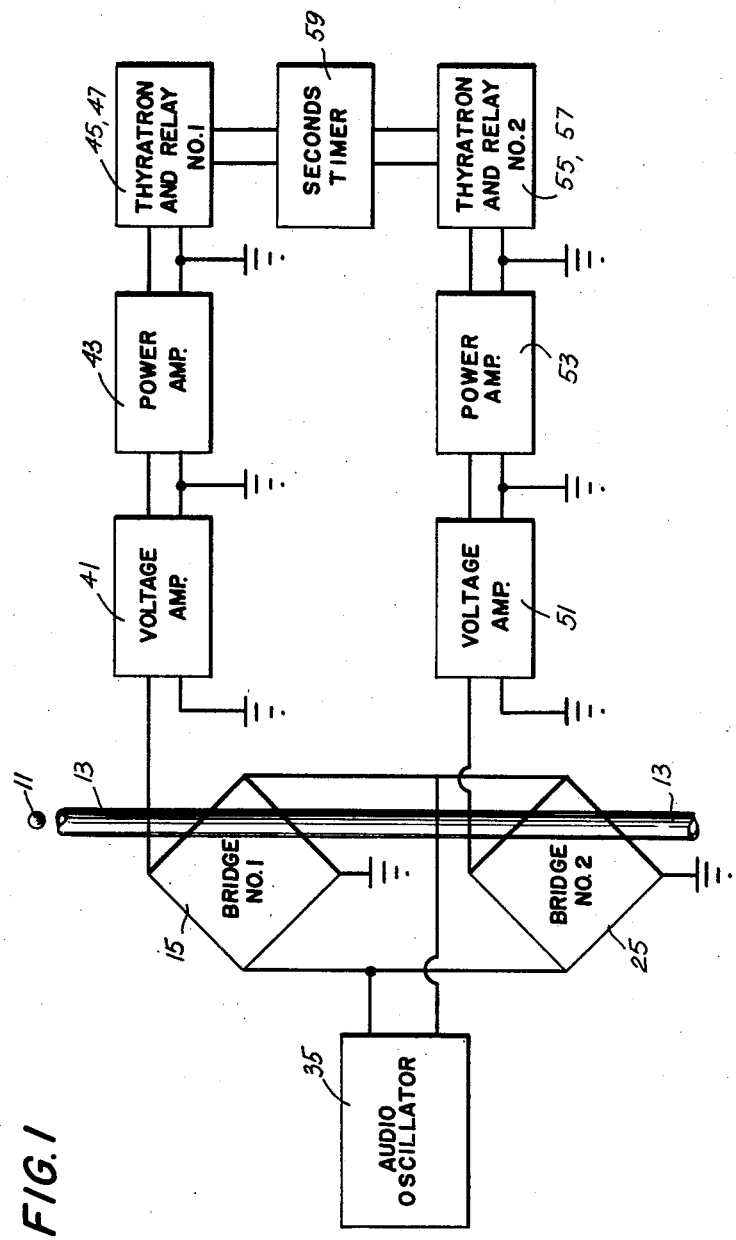

INVENTORS
RAYMOND G. HARMON
FREDERICK A. LORY

BY Howard K Kothe
ATTORNEY

United States Patent Office 3,142,984
Patented Aug. 4, 1964

3,142,984
FLOW MEASUREMENT
Raymond G. Harmon, Charleston, and Frederick A. Lory, South Charleston, W. Va., assignors to Union Carbide Corporation, a corporation of New York
Filed Sept. 27, 1960, Ser. No. 58,752
6 Claims. (Cl. 73—194)

The present invention relates to an apparatus for measuring flow rates of fluid streams and more particularly to an apparatus for measuring flow rates of streams of fluidized particulate solids.

In recent years many industries have developed, for bulk handling and transporting dry solid materials, methods which comprise comminuting or particlizing the materials, fluidizing the particles and applying the principles of hydromechanics to their handling and movement. Such methods have also been widely applied in chemical and physical reaction processes to achieve better reaction conditions and more complete and rapid reactions and to increase the efficacy of catalysts used in such processes. In the coal industry, for example, current research and developement in the catalytic treatment of coal has given impetus to the use of fluidized solids methods. In order effectively to evaluate the efficiency of the bulk materials and processing equipment and methods it is frequently necessary to know the flow rate of the material being transported through conduits, flumes and the like. A simple way to determine flow rate is to measure the time required for a selected particle of the flowing material to traverse a known distance. In its most elemental form, this method consists of observing an identifiable particle through a transparent section of the raceway containing the stream under investigation and timing the passage of said particle between two spaced points along the length of such transparent section. An improvement over the basic method comprises automatic measurement of time for passage of a particle between the two spaced points by means of detector probes inserted through the raceway walls and adapted to develop signals in response to the passage of said selected particle. In many applications, however, the fluidized material may be under pressures too high to permit the insertion of transparent sections of glass or the like in the run of transporting conduit, or to tolerate the breaks in the integrity of the conduit walls attendant upon the use of sensing probes.

The present invention permits the measurement of the time of passage of a selected particle between two spaced points at a measuring station located along a conduit-contained stream of material without requiring rupture of the integrity of the conduit walls or diminution in the conduit strength at the measuring station.

In general, the present invention comprises a magnetic particle which is introduced into the stream of fluidized particles, upstream of the measuring station, a pair of inductive detector coils arranged in fixed spaced relationship on a substantially nonmagnetic section of the conduit containing the fluid stream, electrical circuit means responsive to signals developed by said inductive detector coils, and timing means controllable by said electrical circuit means. The inductive coils are placed around a section of the conduit formed of a nonmagnetic metal such as copper, aluminum, stainless steel, or of a plastic material such as polyethylene, or of any other suitable nonmagnetic material. The magnetic particle, which may be iron or steel, and which is preferably spherical in form, is inserted into the fluid stream and is carried along at the same speed as the particulate fluidized material comprising the stream. As the particle passes through the first of the two inductive detector coils, an electrical signal is developed which initiates operation of the timer means and as the particle passes through the second inductive detector coil, an electrical signal is developed which terminates operation of the timer means. Flow rate can be readily calculated from the elapsed time.

With the foregoing and other features in view, which shall more fully hereinafter appear, the invention comprises novel constructions, combinations and arrangements of components as will now be described in detail and as defined in the appended claims and as illustrated in preferred embodiment in the accompanying drawings.

Figure 2:
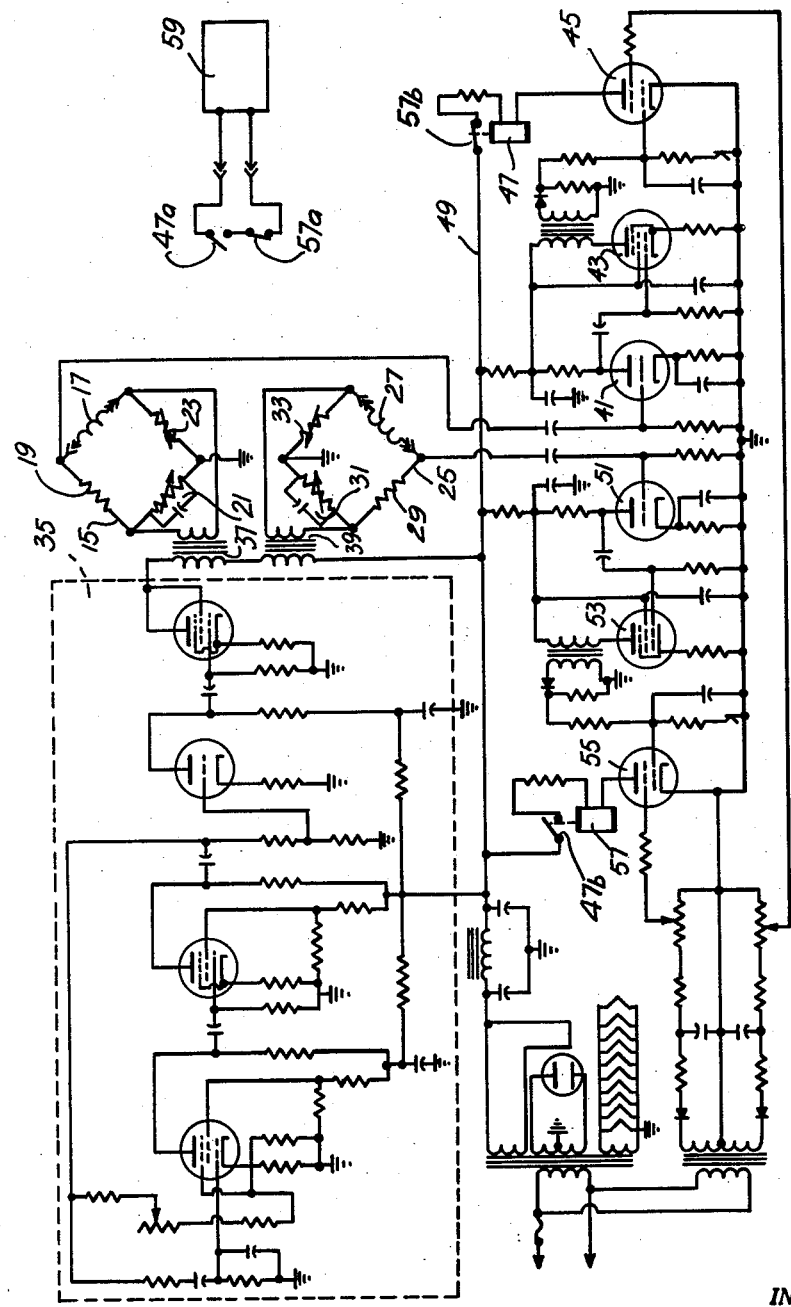

In the drawings:
FIGURE 1 shows an arrangement of the main components of an embodiment of the present invention in block diagram form and
FIGURE 2 is a schematic wiring diagram for the apparatus of the embodiment of the invention shown in FIGURE 1.

Referring specifically to the embodiment shown in the drawings, steel ball 11 is shown poised for introduction into a fluid stream at any convenient point upstream of a metering station, which comprises metering station conduit 13, of stainless steel or the like, first magnetic transducer 17 and second magnetic transducer 27 arranged in fixed spaced relationship around the outer circumference of the metering station conduit. First magnetic transducer 17 and second magnetic transducer 27 form the sensing arms, respectively, of two bridge circuits indicated generally by designations 15 and 25. Fixed resistors 19 and 29, tuning tank bridge elements 21 and 31 and variable resistors 23 and 33 are respectively arranged to complete bridge circuits 15 and 25. An audio frequency oscillator, indicated generally by the designation 35, excites bridge circuits 15 and 25, respectively, through output transformers 37 and 39. First bridge 15 output is connected, through a conventional coupling circuit, to the grid of voltage amplifier 41. The output of voltage amplifier 41 is capacitively coupled to the control grid of power amplifier 43, the output of which is rectified and applied as a triggering signal to the control grid of thyratron 45. In a similar manner, the output of second bridge 27, is connected through voltage amplifier 51 and power amplifier 53 to the control grid of thyratron 55.

Relay coil 47 is connected in the plate circuit of thyratron 45 and controls the operation of relay contactors 47a and 47b, both of which are normally open, i.e., open when relay coil 47 is deenergized. Relay coil 57 is similarly connected in the plate circuit of thyratron 55 and controls the operation of relay contactors 57a and 57b, both of which are normally closed, i.e., closed when relay coil 57 is deenergized.

Contactors 47a and 57a are series connected in the control circuit of timing device 59. Contactor 47b is connected between the plate circuit of thyratron 55 and plate supply voltage line 49. Contactor 57b is connected between the plate circuit of thyratron 45 and plate supply voltage line 49.

To operate the apparatus of my invention, first bridge circuit 15 and second bridge circuit 25 are tuned to null balance by adjustment of the several variable circuit elements 21, 23, 31 and 33, an adjustment facilitated by the use of the separate audio oscillator output transformers 37 and 39. Those skilled in the art will recognize that a single output transformer with two similar secondary windings will accomplish the same purpose as transformers 37 and 39. At the null or bridge zero signal point, conditions in the electronic portion of the circuit are such that no plate current flows in either thyratron stage, relay coils 47 and 57 are deenergized, the plate supply voltage circuit to thyratron 47 is closed, the plate supply voltage circuit to thyratron 57 is open and the control circuit of timing device 59 is open.

With bridge balance attained, steel ball 11 is introduced into the fluid stream at some convenient point upstream of metering station conduit 13, and is carried along mingled with the flowing particulate material. As steel ball 11 passes first magnetic transducer 17, the inductance and inductive reactance of that transducer momentarily changes, unbalancing first bridge circuit 15, thereby developing an output signal which is impressed on the grid of voltage amplifier 41. This signal, amplified, rectified and applied to the control grid of thyratron 45, fires said thyratron, causing thyratron plate current to flow and energize relay coil 47. Energized relay coil 47 closes relay contactor 47a, completing the control circuit of timing device 59, thus commencing measurement of the period to be timed. At the same time, energized relay 47 closes relay contactor 47b, completing connection between the plate circuit of thyratron 55 and plate supply voltage line 49, thereby placing thyratron 55 in condition to fire. The characteristic of a thyratron is such that cathode-plate conduction, once initiated, continues, even when the control grid reassumes its initial bias. Because of this characteristic, plate current continues to flow in the thyratron 45 stage after the steel ball 11 has passed through magnetic transducer 17 and balance is reattained in bridge circuit 15.

At the distal end of metering station conduit 13, steel ball 11 passes through magnetic transducer 27 and, in a manner similar to that described hereinabove, unbalances bridge circuit 25, causes development of an output signal which is amplified, rectified and applied to the control grid of thyratron 55, causing said thyratron to fire. Plate current flowing in the thyratron 55 stage energizes relay coil 57, which in turn, opens relay contactor 57a, interrupting the control circuit of timing device 59 and determining the measurement of the period timed. At the same time, energized relay coil 57 opens relay contactor 57b, thereby interrupting plate supply voltage to thyratron 45. At this instant, plate current in the thyratron 45 stage ceases to flow and relay coil 47 is deenergized, causing contacts 47a and 47b to return to their normally open positions. Since, sequentially, the control circuit of timing device 59 is first interrupted by the opening of relay contactor 57a, the opening of relay contactor 47a has no electrical effect. The opening of relay contactor 47b interrupts plate supply voltage to thyratron 55, causing said thyratron to cease conducting, thereby deenergizing relay coil 57. Upon the deenergization of relay coil 57, relay contacts 57a and 57b reassume their normally closed positions, restoring the system to initial condition in readiness for the next measurement.

The foregoing description and the arrangement of circuit components shown in the drawings are descriptive of but a single embodiment of my invention. Various adaptions of the circuitry and alternate arrangements of components will readily suggest themselves to those skilled in the art.

One alternative arrangement comprehends utilization of a single thyratron with single voltage and power amplification stages. In such an arrangement, a single relay having a normally closed contact with a time delay to open feature, and a normally open contact is required. The normally closed contact is connected in the thyratron plate circuit and would permit conduction for a timed period adjustable to less than the time required for passage of steel ball 11 between the two magnetic transducers. The normally open contact is arranged in the control circuit of a stepping switch which, on sequential energizations, closes and opens a timing device control circuit.

In a further embodiment, the apparatus of my invention comprises two magnetic transducers connected in appropriate bridge circuits, a bridge excitation means, and a high sensitivity pulse responsive time interval reading device directly connected to the bridge output terminals.

While, in the foregoing description, certain specific details and operative steps have been set forth, together with certain suggested modifications, it will be obvious that considerable variations may be made in these without departing from the spirit of the present invention.

The foregoing description has been given for clearness of understanding only, and no unnecessary limitations should be understood therefrom.

What is claimed is:

1. Apparatus for measuring flow rate of a fluid stream comprising, in combination, a magnetic particle adapted to be inserted in said stream and transported with the fluid thereof, a fixed-length section of substantially nonmagnetic conduit disposed to conduct said fluid stream therethrough and having a proximal end and a distal end, first means at the proximal end of said fixed-length section to sense the proximal end passage of said magnetic particle and to develop a first signal at the time of said proximal end passage, second means at the distal end of said fixed-length section to sense the distal end passage of said magnetic particle and to develop a second signal at the time of said distal end passage, said first and second signal developing means being separated by a preselected distance along said conduit section according to the fixed length thereof, a thyratron circuit having at least one control grid responsive to said signals and a plate circuit relay having contacts adapted to sequentially initiate and stop electrical timing action and an electrical timer in circuit with said relay adapted to indicate elapsed time between said signals.

2. Apparatus in accordance with claim 1 in which said first means at the proximal end of said fixed-length section and said second means at the distal end of said fixed-length section are magnetic transducers.

3. Apparatus in accordance with claim 1 in which said first means at the proximal end of said fixed-length section and said second means at the distal end of said fixed-length section are electromagnetic transducers.

4. Apparatus in accordance with claim 1 in which said first means at the proximal end of said fixed-length section and said second means at the distal end of said fixed-length section are electrical inductors.

5. In combination with apparatus for measuring flow rate in a fluid stream which includes a magnetically perceptible particle adapted to be inserted in said stream and transported with fluid media therein; a fixed-length section of substantially nonmagnetic conduit disposed to conduct said fluid stream therethrough from a proximal end to a distal end; a first bridge circuit; a second bridge circuit; a first magnetic transducer located at said proximal end and comprised in said first bridge circuit; a second magnetic transducer located at said distal end and comprised in said second bridge circuit; bridge excitation means in circuit with the first and the second bridge circuits; first output adjustment means in the first bridge circuit adjusted to provide a first bridge signal when said particle passes adjacent said first transducer; and second output adjustment means in the second bridge circuit adjusted to provide a second bridge signal when said particle passes adjacent said second transducer, the improvement which comprises a first thyratron having a first control grid in circuit with said first bridge circuit and a first plate circuit which is conductive upon impingement of said first bridge signal on said first control grid; a second thyratron having a second control grid in circuit with said second bridge circuit and a second plate circuit which is conductive upon impingement of said second bridge signal on said second control grid; a first plate circuit relay in said first plate circuit; a second plate circuit relay in said second circuit; a first normally open contact on said first relay; a second normally open contact on said first relay connected in series relationship between a source of plate supply voltage and the plate circuit of the second thyratron; a first normally closed contact on said second relay; a second normally closed contact on said second relay connected in series relationship between the source of plate supply voltage and the plate circuit of the first thyratron; electrically energized timer means; and a series circuit connecting said first normally open contact, said first normally closed contact and said timer means whereby timing action in said timer means is initiated upon passage of said magnetically perceptible particle adjacent the first transducer and stopped upon passage of said particle adjacent the second transducer.

6. In combination with apparatus for measuring flow rate in a fluid stream which includes a magnetically perceptible particle adapted to be inserted in said stream and transported with fluid media therein; a fixed-length section of substantially nonmagnetic conduit disposed to conduct said fluid stream therethrough from a proximal end to a distal end; a first bridge circuit; a second bridge circuit; a first magnetic transducer located at said proximal end and comprised in said first bridge circuit; a second magnetic transducer located at said distal end and comprised in said second bridge circuit; bridge excitation means in circuit with the first and the second bridge circuits; first output adjustment means in the first bridge circuit adjusted to provide a first bridge signal when said particle passes adjacent said first transducer; and second output adjustment means in the second bridge circuit adjusted to provide a second bridge signal when said particle passes adjacent said second transducer, the improvement which comprises a thyratron having a control grid in circuit with said first and said second bridge circuits and a plate circuit which is conductive upon impingement of either of said bridge signals on said control grid; a plate circuit relay in said plate circuit; a normally closed contact on said relay connected in series relationship between a source of plate supply voltage and the plate circuit of said thyratron, said normally closed contact having a time delay to open characteristic which is adjustable to a time less than the time required for passage of the magnetically perceptible particle between the first transducer and the second transducer; electrically energized timer means; switching means in circuit with said timer means adapted to initiate and stop timing action respectively upon successive actuations of said stepping switch; and a normally open contact on said plate circuit relay in circuit with said switching means whereby timing action in said timer means is initiated upon passage of sad magnetically perceptible particle adjacent the first transducer and stopped upon passage of said particle adjacent the second transducer.

References Cited in the file of this patent

UNITED STATES PATENTS

| | | |
|---|---|---|
| 455,571 | Menzie | July 7, 1891 |
| 2,252,572 | Lang | Aug. 12, 1941 |
| 2,294,730 | Eggers | Sept. 1, 1942 |
| 2,434,349 | Cohen | Jan. 13, 1948 |
| 2,518,149 | Kearsley | Aug. 8, 1950 |
| 2,739,476 | Atkins | Mar. 27, 1956 |
| 2,772,561 | Plank et al. | Dec. 4, 1956 |
| 2,795,273 | Putnam | June 11, 1957 |
| 2,955,459 | Cihelka et al. | Oct. 11, 1960 |